(12) United States Patent
Lauria et al.

(10) Patent No.: US 11,161,597 B2
(45) Date of Patent: Nov. 2, 2021

(54) SYSTEM AND METHOD OF LOCATING FEATHERING PROPELLER BLADE ANGULAR POSITION

(71) Applicant: GE Avio S.r.l., Rivalta di Torino (IT)

(72) Inventors: Davide Lauria, Turin (IT); Alessio Gargioli, Turin (IT); Simone Castellani, Viareggio (IT); Marco Garabello, Turin (IT)

(73) Assignee: GE AVIO S.R.L, Rivalta di Torino (IT)

( * ) Notice: Subject to any disclaimer, the term of this patent is extended or adjusted under 35 U.S.C. 154(b) by 108 days.

(21) Appl. No.: 16/481,937

(22) PCT Filed: Jan. 24, 2018

(86) PCT No.: PCT/EP2018/051739
§ 371 (c)(1),
(2) Date: Jul. 30, 2019

(87) PCT Pub. No.: WO2018/138156
PCT Pub. Date: Aug. 2, 2018

(65) Prior Publication Data
US 2020/0247529 A1 Aug. 6, 2020

(30) Foreign Application Priority Data

Jan. 30, 2017 (EP) .................................... 17425007

(51) Int. Cl.
*B64C 11/38* (2006.01)
*G01D 5/247* (2006.01)

(52) U.S. Cl.
CPC .............. *B64C 11/38* (2013.01); *G01D 5/247* (2013.01)

(58) Field of Classification Search
CPC ................................ B64C 11/38; G01D 5/247
See application file for complete search history.

(56) References Cited

U.S. PATENT DOCUMENTS 2,806,402 A 9/1957 Ferris
4,833,405 A 5/1989 Richards et al.
(Continued)

FOREIGN PATENT DOCUMENTS

DE 102014207279 A1 10/2015
EP 0353076 A2 1/1990
(Continued)

OTHER PUBLICATIONS

European Search Report Corresponding to EP174250076 dated Jun. 30, 2017.
(Continued)

*Primary Examiner* — Michael Lebentritt
(74) *Attorney, Agent, or Firm* — Dority & Manning, P.A.

(57) ABSTRACT

The present disclosure is directed to a turbine engine (10) defining an axial direction, a radial direction, a circumferential direction, a first end (99) and a second end (98) opposite of the first end (99) along the axial direction. The turbine engine includes a propeller assembly (14) proximate to the first end including a plurality of blades (42) arranged in the circumferential direction disposed around an axial centerline (12), and a feathering mechanism (60) including a hollow piston rod (19). The feathering mechanism rotates the plurality of blades about a pitch axis (13) extended in the radial direction from the axial centerline. The turbine engine further includes a housing (45) proximate to the second end disposed in adjacent arrangement with the propeller assembly in the axial direction. The axial centerline is defined through the propeller assembly and the housing. The turbine engine further includes a beta tube assembly (100) extended through the hollow piston rod and at least partially through the housing in coaxial alignment with the axial centerline. The beta tube assembly defines an at least partially hollow walled pipe (101) extended along the axial direction. The (Continued)

beta tube assembly further defines a plurality of grooves (111, 112) extended along the axial direction proximate to the housing. A first groove (111) extends at least partially in the circumferential direction and along the axial direction to at least partially define a helix (114) corresponding to a rotatable range of the plurality of blades about the pitch axis, and a second groove (112) extends in the axial direction.

20 Claims, 8 Drawing Sheets

(56) References Cited

U.S. PATENT DOCUMENTS

| | | | |
|---|---|---|---|
| 4,909,709 | A * | 3/1990 | Raisbeck ............... B64C 11/30 416/25 |
| 4,948,337 | A | 8/1990 | Martin et al. |
| 5,364,231 | A | 11/1994 | Eick et al. |
| 5,865,599 | A | 2/1999 | Pruden et al. |
| 6,213,713 | B1 | 4/2001 | Dickmann |
| 2004/0018914 | A1 | 1/2004 | Stolfus |
| 2015/0139798 | A1 | 5/2015 | Duke et al. |
| 2019/0389562 | A1 * | 12/2019 | Garabello ............. B64C 11/385 |

FOREIGN PATENT DOCUMENTS

| | | |
|---|---|---|
| GB | 2346701 A | 8/2000 |
| GB | 2465575 A | 5/2010 |

OTHER PUBLICATIONS

PCT Search Report Corresponding to PCT/EP2018/051739 dated Apr. 19, 2018.

* cited by examiner

SYSTEM AND METHOD OF LOCATING FEATHERING PROPELLER BLADE ANGULAR POSITION

GOVERNMENT SPONSORED RESEARCH

The project leading to this application has received funding from the Clean Sky 2 Joint Undertaking under the European Union's Horizon 2020 research and innovation program under grant agreement No. CS2-ENG-GAM-2014-2015-01.

FIELD

The present subject matter is generally related to pitch-adjusting or feathering propeller assemblies for turbine engines.

BACKGROUND

Turbine engines are continually challenged to increase efficiencies related to performance, fuel consumption, and/or costs by generally reducing the weight of turbines, such as by reducing part quantities. Turbine engines, such as wind turbines and turboprop gas turbine engines, may include a pitch-adjusting or feathering mechanism at a propeller assembly to adjust a pitch of the propeller blades. Propeller blades may require changes in pitch to increase turbine performance at various conditions (e.g. wind speed, altitude, or power output/input at an engine core or generator). In some instances, such as on aircraft with multiple turboprop engines, feathering the propeller blades is performed to reduce drag across an inoperable engine, thereby improving handling and control while a turboprop engine is inoperable during flight.

However, known systems and/or methods of locating or knowing a pitch angle position and/or rate of change of pitch angle position of a plurality of propeller blades may include pluralities of parts, components, or assemblies that may increase the weight of engines or at least frustrate weight reduction of turbines.

Therefore, there is a need for systems and/or methods of locating a pitch angle position and/or rate of change thereof of a plurality of propeller blades that may reduce weight and/or part quantities of a turbine.

BRIEF DESCRIPTION

Aspects and advantages of the invention will be set forth in part in the following description, or may be obvious from the description, or may be learned through practice of the invention.

The present disclosure is directed to a turbine engine defining an axial direction, a radial direction, a circumferential direction, a first end and a second end opposite of the first end along the axial direction. The turbine engine includes a propeller assembly proximate to the first end comprising a plurality of blades arranged in the circumferential direction disposed around an axial centerline, and a feathering mechanism including a hollow piston rod, wherein the feathering mechanism rotates the plurality of blades about a pitch axis extended in the radial direction from the axial centerline; a housing proximate to the second end disposed in adjacent arrangement with the propeller assembly in the axial direction, wherein the axial centerline is defined through the propeller assembly and the housing; and a beta tube assembly extended through the hollow piston rod and at least partially through the housing in coaxial alignment with the axial centerline. The beta tube assembly defines an at least partially hollow walled pipe extended along the axial direction, and defines a plurality of grooves extended along the axial direction proximate to the housing. A first groove extends at least partially in the circumferential direction and along the axial direction to at least partially define a helix corresponding to a rotatable range of the plurality of blades about the pitch axis, and a second groove extends in the axial direction.

In various examples, the beta tube assembly defines at the first end an elongated slot extended along the axial direction, wherein the beta tube assembly further defines an opening in the elongated slot toward the first end of the beta tube assembly. In one example, the piston rod defines one or more piston rod fastening locations proximate to the first end. In another example, the one or more piston rod fastening locations are defined along the circumferential direction to correspond to a circumferential position of the plurality of blades.

In various examples, the turbine engine includes a plug lock, wherein the plug lock at least partially defines a diameter corresponding to an inner diameter of the hollow piston rod, and wherein the plug lock at least partially defines a key extended in the axial direction corresponding to the elongated slot of the beta tube assembly. In one example, the plug lock further defines one or more plug lock fastening locations. In various examples, the one or more plug lock fastening locations corresponds to the one or more piston rod fastening locations. In still various examples, the plug lock fastening location and the piston rod fastening location correlate the first groove to an angle of the plurality of blades along the pitch axis.

In various examples, the housing of the turbine engine further includes a sensor extended through the housing at least partially in the radial direction, wherein the sensor defines a sensing element proximate to the plurality of grooves of the beta tube assembly. In one example, the sensor defines a capacitive, magnetic, or inductive proximity sensor.

In still various examples, the piston rod defines an internally threaded portion, and wherein the beta tube assembly defines an externally threaded portion corresponding to the internally threaded portion of the piston rod.

In still various examples of the turbine engine, the beta tube assembly defines one or more internal walls, wherein the one or more internal walls defines a hydraulic fluid transfer cavity. In one example, the beta tube assembly further defines a plurality of hydraulic fluid transfer orifices.

Another aspect of the present disclosure is directed to a method of determining angular position about a pitch axis of propeller blades in a feathering propeller assembly and a rate of change thereof. The method includes positioning a first groove on a beta tube assembly corresponding to an angular position of the propeller blades about a pitch axis of the feathering propeller assembly; positioning a second groove on the beta tube assembly corresponding to a reference angle; rotating the beta tube assembly about an axial centerline; positioning a proximity sensor relative to the first groove and the second groove such that the proximity sensor captures a signal from the first groove and the second groove when in rotation; and determining the angular position of the propeller blades.

In various examples of the method, the signal is a time between the each of the first groove and the second groove reaching radial proximity to the proximity sensor as the beta tube rotates about the axial centerline. In one example, determining the angular position of the propeller blades further includes corresponding the signal from the first groove relative to the signal from the second groove to the angular position of the propeller blades about the pitch axis.

In still various examples, the first groove defines an at least partially helical groove on the beta tube assembly along an axial direction.

The method may further include translating the beta tube assembly along the axial direction such that a circumferential distance between the first groove and the second groove changes along the axial direction.

Still further, the method may include setting an angular position of the beta tube assembly to correspond to the angular position of the propeller blades. In one example, setting an angular position of the beta tube assembly includes defining a fastening location of a piston rod relative to the beta tube assembly, and wherein the fastening location corresponds to the angular position of the propeller blades.

These and other features, aspects and advantages of the present invention will become better understood with reference to the following description and appended claims. The accompanying drawings, which are incorporated in and constitute a part of this specification, illustrate aspects of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
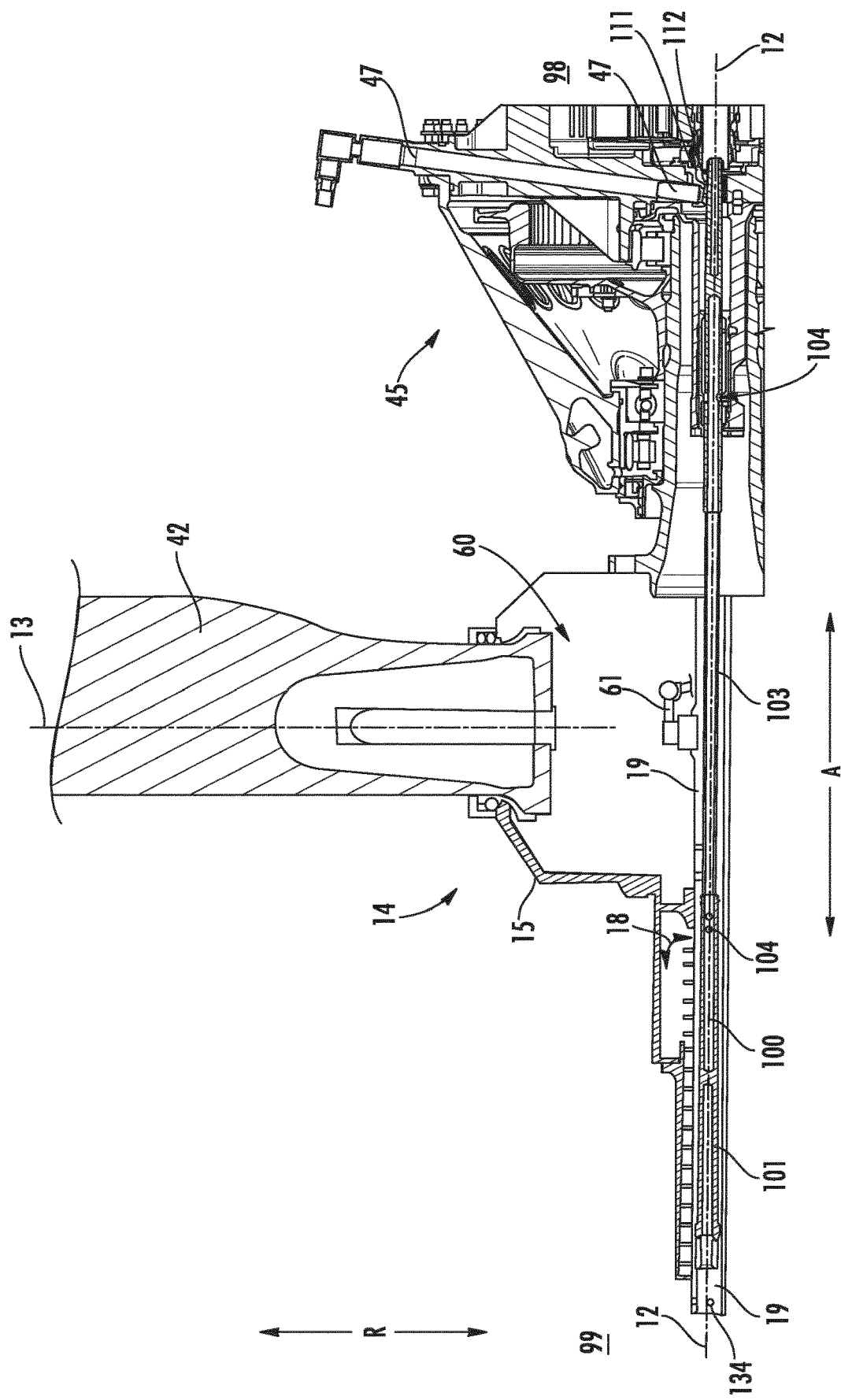
FIG. 1 is a cross sectional side view of an exemplary embodiment of a propeller assembly and housing defining a feathering or pitch-adjustment mechanism.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Systems and methods of locating a pitch angle position and/or rate of change thereof of a plurality of propeller blades that may reduce weight and/or part quantities of a turbine are generally provided. Various embodiments of the systems and methods provided herein generally include a beta tube assembly defining a plurality of grooves at an end proximate to a sensor, in which a first groove extends at least partially in a circumferential direction and along an axial direction to at least partially define a helix corresponding to a rotatable or angular range of feathering propeller blades in a propeller assembly, and a second groove extends in the axial direction to generally provide a reference mark or differential relative to the angular range of the feathering propeller blades.

The various embodiments of the systems and methods provided herein may improve turbine performance by reducing part quantities and/or weight. For example, the systems and methods provided herein may reduce part quantities and/or weight by providing a locating system or method for all feathering propeller blades of a propeller assembly at a single location in contrast to individual propeller blades. As another example, the systems and methods provided herein may improve turbine engine performance by providing a propeller blade angle locating system or method including a single sensor to locate an angular position and/or rate of change of pitch angle of all feathering propeller blades. As yet another example, the systems and methods provided herein may improve propeller blade pitch angle locating systems and methods by utilizing a common sensor for locating pitch angle for all propeller blades and for detecting rotational speed for the propeller assembly. As still yet another example, the systems and methods provided herein may locate propeller blade pitch angle and/or rate of change thereof via parts, components, or assemblies that also provide other functions, such as oil transfer and feathering of the beta tube assembly and/or the sensor for measuring rotational speed of a propeller assembly and pitch angle of the plurality of blades.

Referring now to the drawings, FIG. 1 is a cross sectional side view of a portion of a turbine 10 including exemplary embodiments of a propeller assembly 14 and a housing 45 together defining a pitch-adjustment or feathering mechanism 60. The turbine 10 defines an axial direction A, a radial direction R, a circumferential direction C (shown in FIG. 2), a first end 99 and a second end 98 opposite of the first end along axial direction A. The propeller assembly 14 and the housing 45 are disposed in adjacent arrangement along the axial direction A. An axial centerline 12 is defined through the propeller assembly 14 and the housing 45 along the axial direction A. The propeller assembly 14 is disposed proximate to the first end 99 of the turbine 10. The housing 45 is disposed proximate to the second end 98 of the turbine 10.

In various embodiments, the housing 45 defines a power or reduction gearbox assembly coupling the propeller assembly 14 to a generator or engine core 20. In one embodiment, the generator or engine core 20 may include turbomachinery, such as defining a compressor section and a turbine section generating mechanical energy, such as turboprop, turboshaft, or propfan engine configurations. Mechanical energy produced by the generator or engine core 20 transmits through the housing 45 defining a gearbox to generate a desired torque and rotational speed for the propeller assembly 14 to rotate and operate. In another embodiment, the generator or engine core 20 defines a reciprocating engine coupled to the housing 45, and in various embodiments operated similarly as described in regard to turbomachinery. In yet another embodiment, the generator or engine core 20 may include an electrical generator such as defined in wind or hydro turbines. The propeller assembly 14 may rotate due to passing of a fluid, such as air or water, across the plurality of blades 42 of the propeller assembly 14. The mechanical energy from the rotation of the propeller assembly 14 is transmitted through the housing 45 defining a gearbox to a desired mechanical torque or speed to the generator or engine core 20. The generator or engine core 20 may convert the mechanical energy into electrical energy for further distribution.

Figure 2:
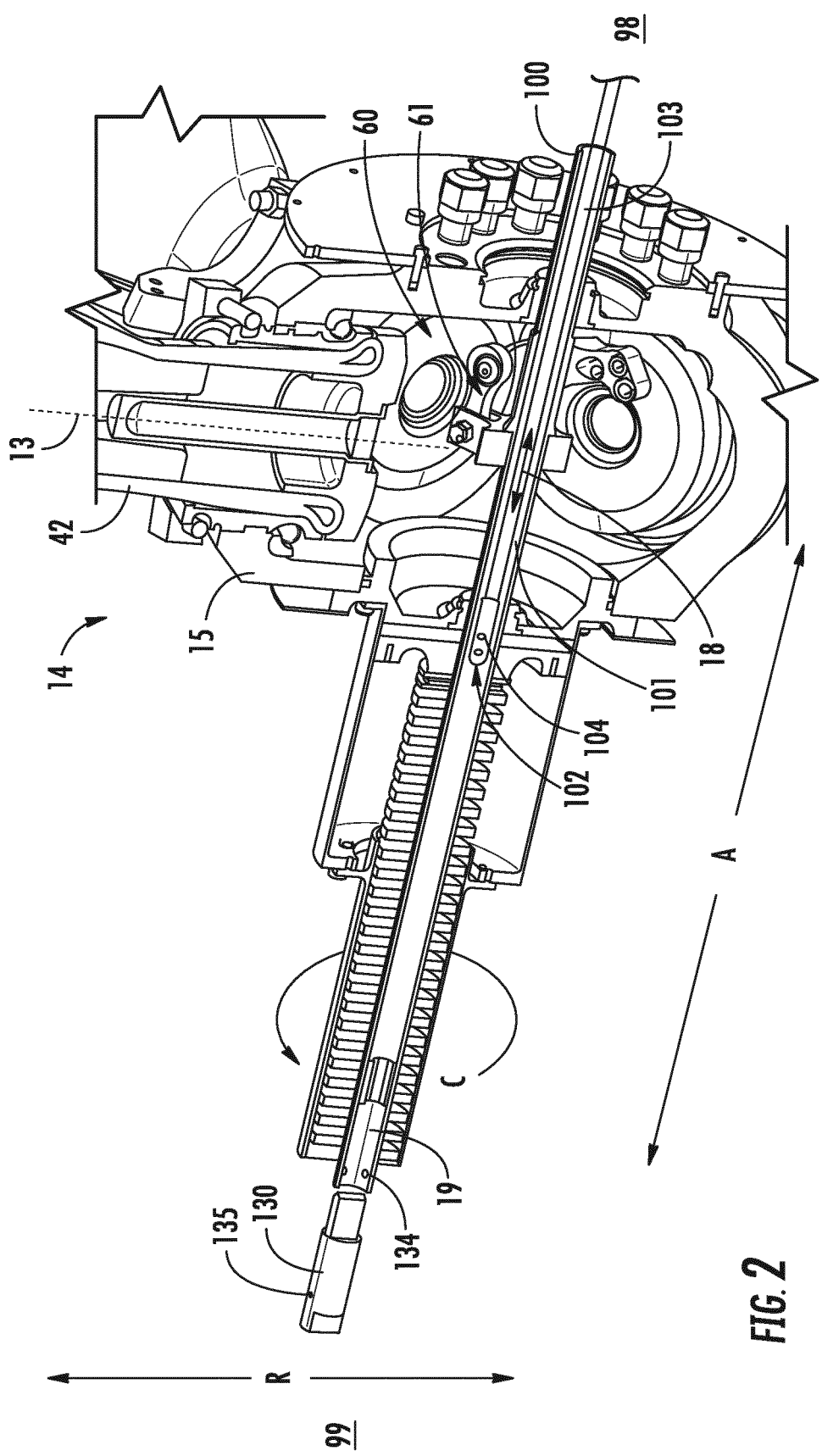
FIG. 2 is a partially exploded perspective view of an exemplary embodiment of a beta tube assembly of the feathering mechanism of the propeller assembly.

Referring now to FIG. 2, a partially exploded perspective view of an exemplary embodiment of the propeller assembly 14 is shown including a portion of the feathering mechanism 60. Referring now to FIGS. 1 and 2, the propeller assembly 14 includes a plurality of blades 42 arranged in the circumferential direction C, in which the plurality of blades 42 are rotatable about the axial centerline 12. The propeller assembly 14 includes a hub 15 into which the plurality of blades 42 are placed and extend from in the radial direction R. The propeller assembly 14 further includes at least one hollow piston rod 19 extended along the axial direction A. The piston rod 19 is coupled to a feathering lever 61. The feathering lever 61 is further coupled to the plurality of blades 42 such that movement of the feathering lever 61 along the axial direction A translates into rotational movement of the plurality of blades 42 about a pitch axis 13 extended in the radial direction R from the axial centerline 12, in which each pitch axis 13 is relative to each blade 42.

The feathering mechanism 60 defined in the propeller assembly 14 and the housing 45 includes a beta tube assembly 100 extended through the hollow piston rod 19. The beta tube assembly 100 extends at least partially through the propeller assembly 14 and at least partially through the housing 45 in coaxial alignment with the axial centerline 12. The beta tube assembly 100 defines an at least partially hollow walled pipe 101 extended along the axial direction A. The beta tube assembly 100 may further define retention features relative to the piston rod 19 through which it extends. For example, in one embodiment, the beta tube assembly 100 may define external threads corresponding to internal threads within the hollow piston rod 19. The beta tube assembly 100 further defines one or more internal walls 102 within the at least partially hollow beta tube assembly 100, in which the one or more internal walls 102 defines a hydraulic fluid transfer cavity 103. The beta tube assembly 100 further defines a plurality of hydraulic fluid transfer orifices 104 through which a hydraulic fluid, such as oil and shown schematically by arrows 18, may pass into and out of the beta tube assembly 100 through the hydraulic fluid transfer cavity 103 under variable pressures or loads.

As a pressure and/or flow of the hydraulic fluid 18 is adjusted, the beta tube assembly 100 may translate along the axial direction A to one of several desired positions corresponding to a rotational direction of the plurality of blades 42 about the pitch axis 13. As the beta tube assembly 100, and subsequently the piston rod 19 to which it is attached, translates along the axial direction A, the feathering lever 61 coupled to the plurality of blades 42 translates along the axial direction A and converts the axial translation of the feathering lever 61 and the piston rod 19 into angular rotation of the plurality of blades 42 about the pitch axis 13.

In other embodiments, changes in a pressure of the hydraulic fluid 18 may affect counterweights, pistons, and/or hydraulic fluid reservoirs that may force the plurality of blades 42 to a particular angle along the pitch axis 13. Changes in pressure or flow of the hydraulic fluid 18 may at least in part be a function of position or translation along the axial direction A of the plurality of hydraulic fluid transfer orifices 104 defined in the beta tube assembly 100. In various embodiments, the axial position of the beta tube assembly 100, including certain features such as, but not limited to, the plurality of hydraulic fluid transfer orifices 104, may correlate to an angle or range of angular movement about the pitch axis 13 for the plurality of blades 42.

Figure 3:
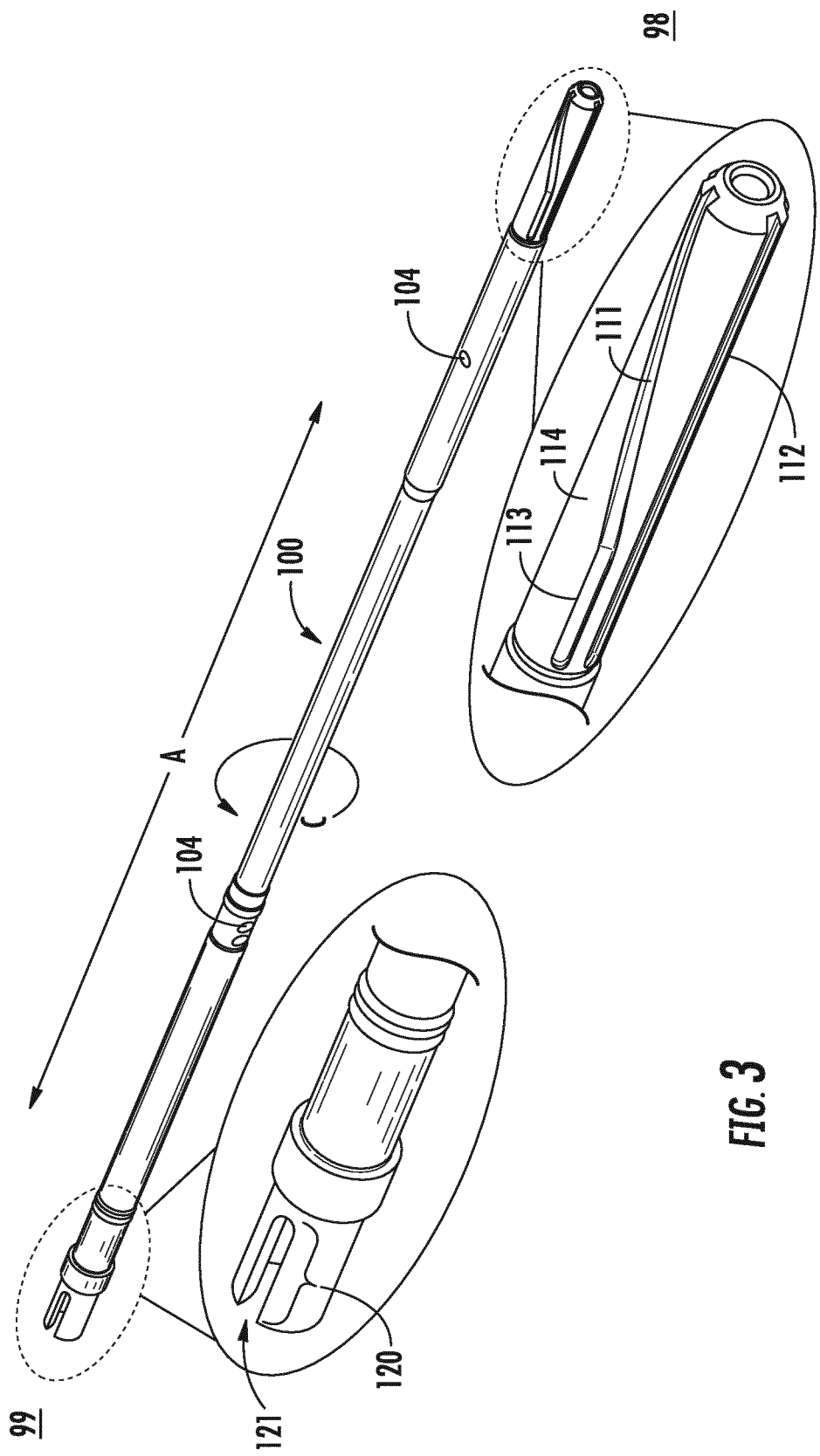
FIG. 3 is a perspective view of a portion of an exemplary embodiment of the beta tube assembly shown in FIG. 2.

Referring now to FIG. 3, a perspective view of an exemplary embodiment of the beta tube assembly 100 is shown separate from the propeller assembly 14 and the housing 45. Referring now to FIGS. 1-3, the beta tube assembly 100 further defines a first groove 111 extended along the axial direction A proximate to the housing 45. The first groove 111 extends at least partially in the circumferential direction C and along the axial direction A to at least partially define a helical portion or helix 114 corresponding to a rotatable range of the plurality of blades 42 about the pitch axis 13. The first groove 111 may further define a substantially straight portion 113 along the axial direction A leading into the helical portion 114.

The beta tube assembly 100 further defines a second groove 112 extended in the axial direction A. The second groove 112 defines a substantially straight portion along the axial direction A. The first groove 111, or particularly the transition from the straight portion 113 through the helical portion 114, may define a distance along the circumferential direction C approximately equivalent or corresponding to an amount of angular rotation of the plurality of blades 42 about the pitch axis 13.

Referring still to FIGS. 1-3, the housing 45 may further include a sensor 47 extended at least partially in the radial direction R through the housing 45. The sensor 47 is disposed toward and/or in proximity to the grooves 111, 112 of the beta tube assembly 100. In various embodiments, the sensor 47 may define a capacitive, magnetic, or inductive proximity sensor. In still other embodiments, the grooves 111, 112 may define an appropriate material relative to the sensor 47. For example, the grooves 111, 112 may define a permanent magnet. As another example, the grooves 111, 112 may define a permanent magnet material defining magnetic flux or magnetic flux density properties greater than at least the beta tube assembly 100 toward the second end 98 proximate to the sensor 47.

In various embodiments, the first groove 111 and/or the second groove 112 may define an area or strip of a first material defined in contrast to the beta tube assembly undefined by the first and second grooves 111, 112 such that the sensor 47 detects the first and second grooves 111, 112 when in rotation about the axial centerline 12. In various embodiments, the first and/or second grooves 111, 112 may define walls, rails, teeth, or other raised structures for differentiating a signal (e.g. a capacitive, inductive, magnetic, or electromagnetic signal) at the first and second grooves 111, 112 in contrast to the beta tube assembly 100 undefined by the first and second grooves 111, 112 (e.g. all circumferential areas other than the grooves 111, 112). In one embodiment, the first and/or second grooves 111, 112 may define a first material and a raised structure, and the beta tube assembly 100 undefined by the first and second grooves 111, 112, may define a second material, in which the first material defines a magnetic flux or a magnetic flux density toward the sensor 47 greater than second material.

Figure 4:
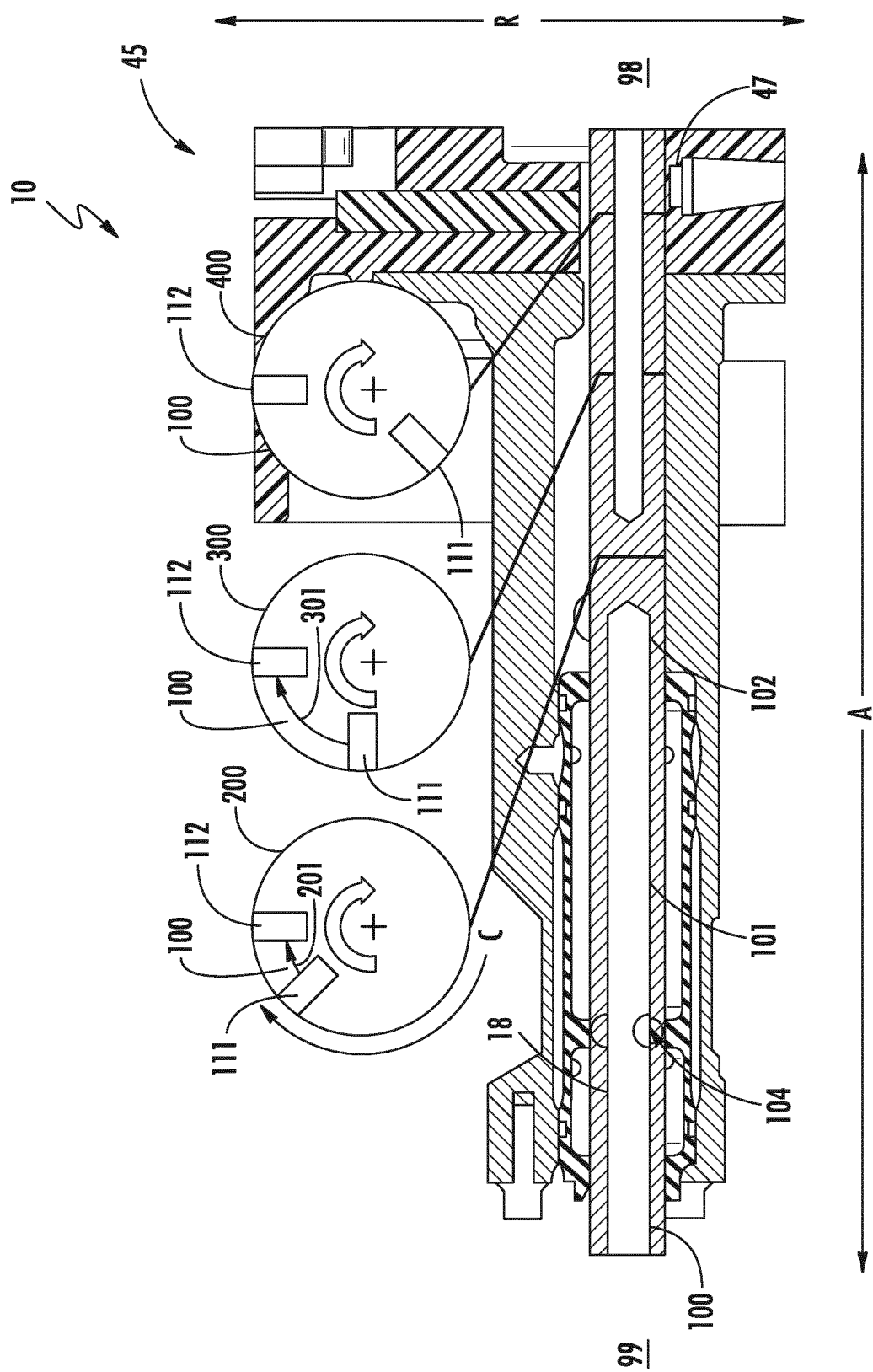
FIG. 4 is a cross sectional side view of an exemplary embodiment of the beta tube assembly shown in FIG. 3 within a housing.

Referring now to FIG. 4, a cross sectional side view of an exemplary embodiment of a portion of the beta tube assembly 100 within the housing 45 is shown. The first groove 111 and the second groove 112 may together define phased grooves in co-rotation with the plurality of blades 42. Exemplary embodiments of various phases are shown in the detailed cross-sectional views at 200, 300, and 400 of FIG. 4. As the beta tube assembly 100 translates along the axial direction A to rotate the plurality of blades 42 about the pitch axis 13, the phase or distance along the circumferential direction C of the first groove 111 relative to the second groove 112 changes. For example, when the beta tube assembly 100 translates along the axial direction A such that the grooves 111, 112 at view 200 are proximate to the sensor 47, the first groove 111 defines a first phase or distance along the circumferential direction C corresponding to a first pitch angle 201 of the plurality of blades 42. As another example, when the beta tube assembly 100 translates such that the grooves 111, 112 at view 300 are proximate to the sensor 47, the first groove 111 defines a second phase or distance along the circumferential direction C corresponding to a second pitch angle 301 of the plurality of blades 42. As yet another example, when the beta tube assembly 100 translates such that the grooves 111, 112 at view 400 are proximate to the sensor 47, the first groove 111 defines a third phase or distance along the circumferential direction C corresponding to a third pitch angle 401 of the plurality of blades 42.

In various embodiments, the sensor 47 may produce a signal as the second groove 112 and the first groove 111 each pass the sensor 47 during rotation of the beta tube assembly 100 with the propeller assembly 14 about the axial centerline 12. The phase produced by the signal may define a function of a time from the second groove 112 passing the sensor 47 to the first groove 111 passing the sensor 47 and relative to a rotational speed of the beta tube assembly 100. The phase may be correlated to discrete angular positions of the plurality of blades 42 about the pitch axis 13. The phase may further be correlated based at least on a known distance along circumferential direction C approximately equal to the rotational movement of the feathering lever 61 rotating the plurality of blades 42.

In still other embodiments, the sensor 47 may further define a speed sensor for the propeller assembly 14 in addition to a proximity sensor defining the angular location of the plurality of blades 42 about the pitch axis 13. The signal received from at least one of the grooves 111, 112 may be used to define a rotational speed of the beta tube assembly 100, piston rod 19, and plurality of blades 42. In various embodiments, the rotation and rotational speed are about the axial centerline 12. In other embodiments, the plurality of blades 42 may be offset from the axial centerline 12 shown in FIGS. 1-5 shared by the beta tube assembly 100 and/or the piston rod 19.

Referring back to FIG. 3, the beta tube assembly 100 may further define at the first end 99 an elongated slot 120 along the axial direction A. The beta tube assembly 100 may further define an opening 121 in the elongated slot 120 toward the first end 99 of the beta tube assembly 100.

Figure 5:
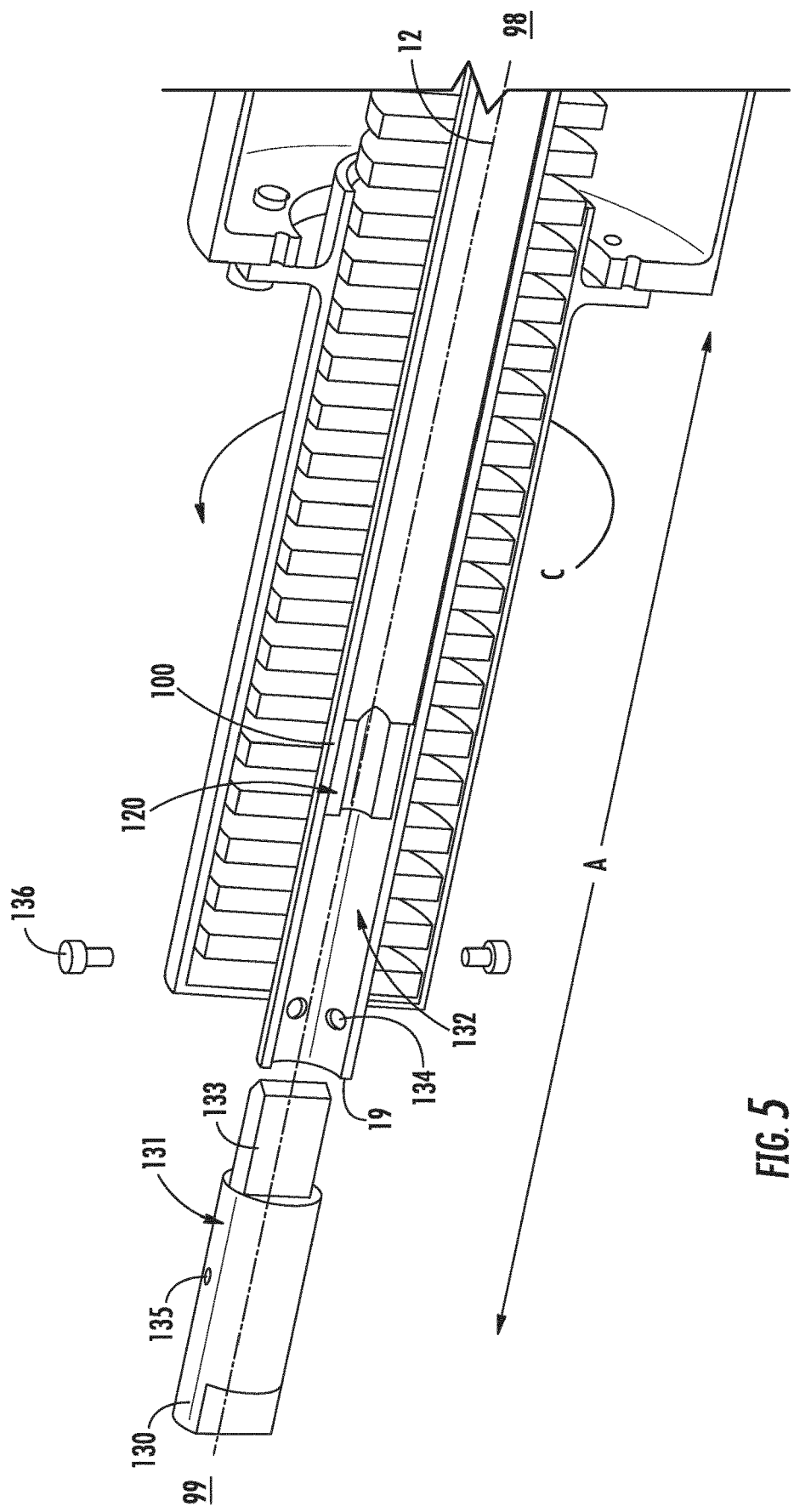
FIG. 5 is a partially exploded perspective view of an exemplary embodiment of the beta tube assembly, piston rod, and plug lock.

Referring now to FIG. 5, a partially exploded perspective view of a portion of the turbine 10 including the beta tube assembly 100 and the piston rod 19 are provided.

As shown in FIGS. 3 and 5, the turbine 10 may further include a plug lock 130. The plug lock 130 may be at least partially extended along the axial direction A in which a diameter 131 is defined at least partially along an outer surface of the plug lock 130 extended along the axial direction A. The diameter 131 of the plug lock 130 corresponds to an inner diameter 132 of the hollow piston rod 19. The plug lock 130 at least partially defines a key 133 extended in the axial direction A corresponding to the elongated slot 120 of the beta tube assembly 100.

The piston rod 19 may further define one or more piston rod fastening locations 134 in which each piston rod fastening location 134 corresponds to a circumferential position of one or more of the plurality of blades 42. The plug lock 130 may further define one or more plug lock fastening locations 135 to correspond to the one or more piston rod fastening locations 134. For example, the one or more fastening locations 134, 135 may each define an orifice through which a mechanical fastener 136, such as, but not limited to, a locking screw, bolt, pin, or rivet, may insert through the piston rod 19 and the plug lock 130. As another example, the one or more piston rod fastening locations 134 may define a location or position on the piston rod 19 corresponding to an angular position of one or more of the plurality of blades 42 at which orientation the plug lock 130 is joined to the piston rod 19. Joining methods may include welding, soldering, or applying an adhesive, etc.

The plug lock 130 may secure a radial orientation of the beta tube assembly 100 relative to the piston rod 19. The combination of the plug lock 130 and the one or more fastening location 134, 135, as well as the key 133 and the elongated slot 120 may secure the radial orientation of the beta tube assembly 100 to correspond to the pitch angle of the plurality of blades 42. For example, the one or more piston rod fastening locations 134 correspond to the circumferential position of one or more of the plurality of blades 42 about the axial centerline 12. The beta tube assembly 100 within the piston rod 19 clocks or rotates within the piston rod 19. The plug lock 130 inserts through the piston rod 19 into the elongated slot 120 defined in the beta tube assembly 100. The plug lock fastening locations 135 and the key 133 inserted through the elongated slot 120 of the beta tube assembly 100 correlate the beta tube assembly 100 to the plurality of blades 42. In various embodiments, the plug lock 130 clocks or sets the piston rod 19 and/or the beta tube assembly 100 while the plurality of blades 42 define a feathered position.

Figure 6:
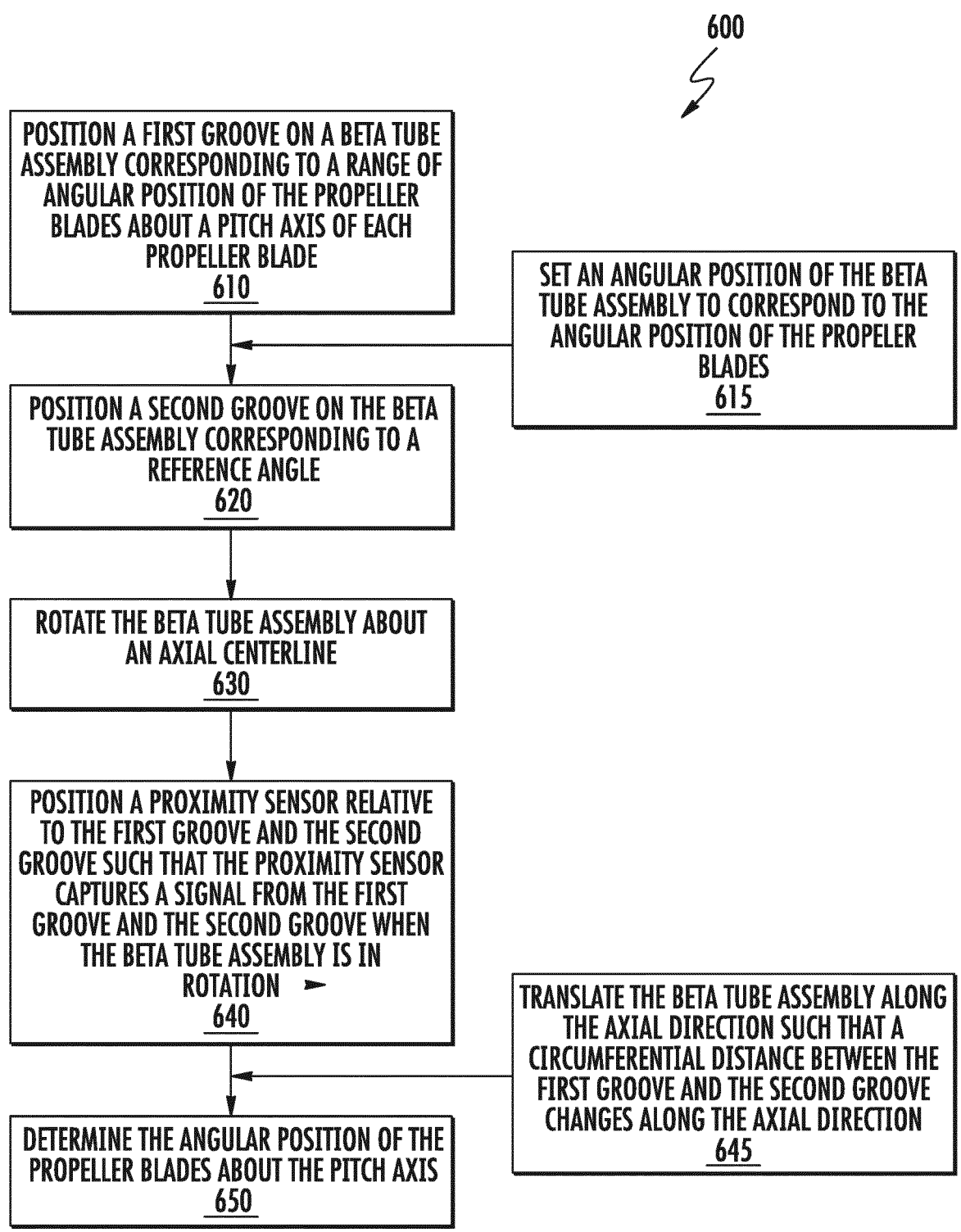
FIG. 6 is a flowchart outlining steps of an exemplary method of determining angular position of propeller blades in a feathering propeller assembly.

Referring now to FIG. 6, a flowchart of an exemplary embodiment of a method of determining angular position about a pitch axis and/or rate of change thereof of propeller blades in a feathering propeller assembly 600 is provided (herein referred to as "method 600"). The method 600 may determine the pitch angle and/or rate of change of the plurality of blades in a turbine such as that shown and described in regard to FIGS. 1-5. The method 600 may determine the pitch angle of the plurality of blades while reducing weight and/or part quantities for pitch angle detection systems. Additionally, the method 600 may determine the pitch angle of the plurality of blades using systems common to existing feathering mechanisms, propeller assemblies, or gearboxes. FIG. 6 depicts steps performed in a particular order for the purposes of illustration and discussion. Those of ordinary skill in the art, using the disclosures provided herein, will understand that various steps of any of the methods disclosed herein can be adapted, modified, rearranged, omitted, or expanded in various ways without deviating from the scope of the present disclosure.

The method 600 generally includes at 610 positioning a first groove on a beta tube assembly corresponding to a range of angular position of the propeller blades about a pitch axis of each propeller blade, at 620 positioning a second groove on the beta tube assembly corresponding to a reference angle, at 630 rotating the beta tube assembly about an axial centerline, at 640 positioning a proximity sensor relative to the first groove and the second groove such that the proximity sensor captures a signal from the first groove and the second groove when the beta tube assembly is in rotation, and at 650 determining the angular position of the propeller blades about the pitch axis.

The method at 610 and 620 may position a first and second groove such as shown and described in regard to FIGS. 1-5 (e.g. the first groove 111 and the second groove 112 defined on the beta tube assembly 100). In various embodiments, the method 600 at 610 and 620 may define the first groove and/or the second groove as raised material, such as teeth, rails, or walls. In other embodiments, the method 600 at 610 and 620 may define the first and/or second grooves as a first material, such as a permanent magnet, or a permanent magnet defining a higher magnetic flux or magnetic flux density relative to a surrounding second material of the beta tube assembly. The material(s) and/or structure defined by the first and/or second grooves in 610 and 620 are such that during rotation of the beta tube assembly in 630 (e.g. rotation of the plurality of blades 42 of the propeller assembly 14), a signal is generated in 640 when the first and second grooves each pass a sensor (e.g. the sensor 47) in contrast to radial locations along the beta tube assembly undefined by the first and second grooves.

In one embodiment, the method 600 at 650 may further include corresponding the signal from the first groove relative to the signal from the second groove to the angular position of the propeller blades about the pitch axis. In various embodiments, the signal captured in step 640 is a time between each of the first groove and the second groove reaching radial proximity to the proximity sensor as the beta tube rotates about the axial centerline. For example, corresponding the signal relative to each of the first groove and the second groove may include corresponding an angular position to a rotational speed of the beta tube assembly and a difference in time between the signal relative to each of the first and second grooves. In various embodiments, the first groove defines an at least partially helical groove on the beta tube assembly along an axial direction, such as the first groove 111 defined in the beta tube assembly 100 shown and described in regard to FIGS. 1-5. Corresponding the angular position may include a function of the rotational speed of the beta tube assembly (e.g. in revolutions per minute) to a difference in time between the signal relative to each of the first and second grooves to calculate the distance in radians or degrees of revolution about an axial centerline (e.g. the axial centerline 12). The distance in radians or degrees may then correspond to a pitch axis angle of the plurality of blades (e.g. the turbine 10 and plurality of blades 42 as shown and described in regard to FIGS. 1-5).

In various embodiments, determining the angular position of the propeller blades about the pitch axis at 650 may further include determining a rate of change of the angular position of the propeller blades about the pitch axis. For example, determining the rate of change of the propeller blades about the pitch axis may include corresponding a plurality of angular positions as function of corresponding a plurality of rotational speeds of the beta tube assembly to a change in time between changes in angular positions, such as through integral functions determining a rate of change of a rate of change in angular position between the first and second grooves relative to a sensor (e.g., sensor 47). As another example, the sensor, such as a speed sensor, may detect or sample the first groove at a first time and the second groove at a second time, determine a difference between the first time and the second time that may then correspond to a difference in radians or degrees that correlates to a first angular position about the pitch axis. The sensor may then detect or sample the first groove at a third time and the second groove at a fourth time and similarly determine a second angular position of the propeller blades about the pitch axis. The sensor, or other systems connected thereto, such as computers including one or more processors and one or more memory devices, may determine a rate of change between the first and second angular positions of the propeller blades about the pitch axis. In still various embodiments, the determined rate of change may be sent to and received by a controller, such as an engine electronic control, or digital engine control, or full-authority digital engine control (FADEC), or a mechanical controller or governor, that may utilize the determined rate of change to adjust one or more of a generator or engine core (e.g. generator or engine core 20) speed or torque output, or to limit or encourage feathering or change of the propeller blade pitch, or to otherwise synchronize propeller blade pitch angular position, or rate of change thereof, to one or more generator or engine core systems or systems attached thereto.

In various embodiments, the method 600 may further include at 645 translating the beta tube assembly along the axial direction such that a circumferential distance between the first groove and the second groove changes along the axial direction. In one embodiment, at least partially defining the first groove as a helix extended along the axial direction may define the first groove relative to the second groove such that the circumferential distance between each groove changes as the beta tube assembly translates along the axial direction, such as shown and described in regard to the beta tube assembly 100, first groove 111, second groove 112, and sensor 47 shown in FIGS. 1-5 collectively.

In various embodiments, the method 600 may further include at 615 setting an angular position of the beta tube assembly to correspond to the angular position of the propeller blades. Setting the angular position may include defining a fastening location of a piston rod relative to the beta tube assembly in which the fastening location corresponds to the angular position of the propeller blades. For example, as shown and described in regard to FIGS. 1-5, setting the pitch axis angular position may include correlating the plurality of blades 42 to the one or more fastening locations 134 of the piston rod 19 and correlating the one or more fastening locations 134 of the piston rod 19 to the first groove 111 of the beta tube assembly 100.

In various embodiments, defining the second groove on the beta tube assembly corresponding to the reference angle at 620 may include setting a zero or reference angle at which the sensor detects a full or complete rotation of the beta tube assembly. For example, referring to FIGS. 1-5, the second groove 112 on the beta tube assembly 100 is defined straight along the axial direction A such that the second groove 112 remains in the same position along a circumference of the beta tube assembly 100 relative to the sensor 47. As the helical portion 114 of the first groove 111 changes along the axial direction A, the second groove 112 provides a reference for the sensor 47 to capture how the first groove 111 changes. Changes in the first groove 111 relative to the second groove 112 and sensor 47 correlate to changes in angular position of the plurality of blades 42 about the pitch axis 13.

The various embodiments of the systems and methods shown and described in regard to FIGS. 1-6 may improve turbine performance by reducing part quantities and/or weight. For example, the systems and methods provided herein may reduce part quantities and/or weight by providing a locating system and method for all feathering propeller blades 42 of a propeller assembly 14 at a single location along the beta tube assembly 100 in contrast to individual propeller blades 42. As another example, the systems and methods provided herein may improve turbine engine performance by providing a propeller blade pitch angle locating system or method including a single sensor 47 to locate an angular position and/or rate of change of all feathering propeller blades 42. As yet another example, the systems and methods provided herein may improve propeller blade pitch angle locating systems and methods by utilizing a common sensor 47 for locating angle along the pitch axis 13 for all propeller blades 42 and for detecting rotational speed for the propeller assembly 14, such as along the beta tube assembly 100. As still yet another example, the systems and methods provided herein may locate propeller blade angle along the pitch axis 13 via parts, components, or assemblies that may also provide other functions, such as oil transfer and feathering of the beta tube assembly 100 and/or the sensor 47 for measuring rotational speed about the axial centerline 12 (e.g. of a fan or propeller assembly 14) and angle about the pitch axis 13 (e.g. propeller feathering position angle).

Figure 7:
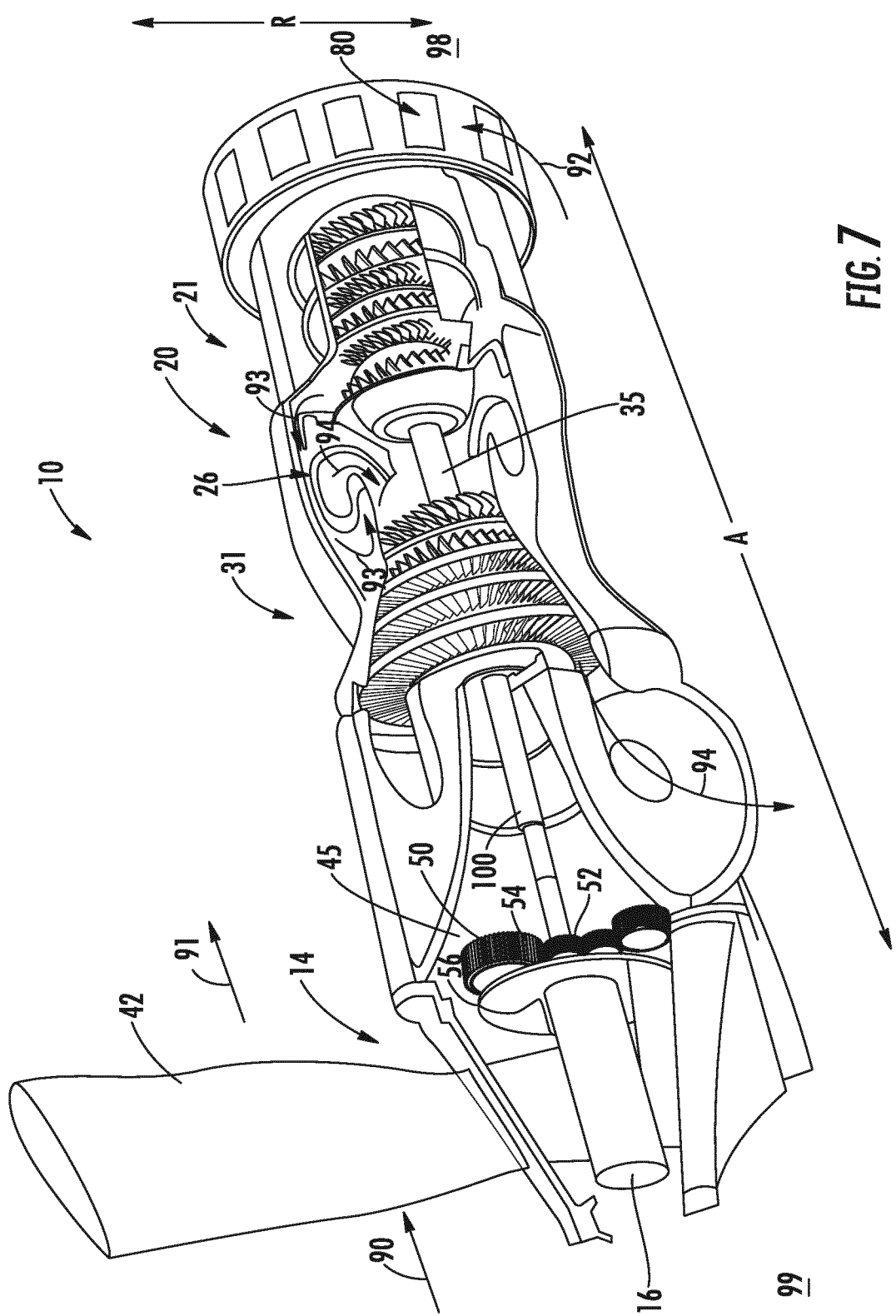
FIG. 7 is a perspective view of an exemplary embodiment of a turbine including an aspect of the present disclosure.

Referring now to FIG. 7, various embodiments of the turbine 10 are generally provided. In one embodiment, the turbine 10 defines a turboprop or turboshaft engine. The axial centerline 12 extended through the propeller assembly 14 and the housing 45 extend also through the turbine 10 as shown in FIG. 7.

In general, the turbine 10 may include the generator or engine core 20 and the propeller assembly 14. The generator or engine core 20 may generally include, in serial flow arrangement, a compressor section 21, a combustion section 26, and a turbine section 31. The compressor section 21 may define one or more compressors, such as a high pressure compressor (HPC) and a low pressure compressor (LPC). The turbine section 31 may define one or more turbines, such as a high pressure turbine (HPT) and a low pressure turbine (LPT). In various embodiments, the compressor section 21 may further include an intermediate pressure compressor (IPC). In still other embodiments, the turbine section 31 may further include an intermediate pressure turbine (IPT). In wind turbine applications, the engine core 20 may generally be defined as one or more generators.

Each of the compressors 22, 24 in the compressor section 21 and each of the turbines 28, 30 in the turbine section 31 may include one or more rotors. In one embodiment, the rotors include one or more shafts 35 of the turbine 10 connecting the compressor section 21 to the turbine section 31. In other embodiments, the rotors generally define a disk extended at least partially in the radial direction R and a plurality of airfoils connected in circumferentially adjacent arrangement and extended outward in the radial direction R from the disk. In one embodiment, the one or more rotors may each be connected together. For example, each rotor 32 of the turbine section 31 or the compressor section 21 may be connected by mechanical fasteners, such as bolts, nuts, screws, or rivets, or by a bonding process, such as welding, friction bonding, diffusion bonding, etc. In various embodiments, one or more compressors of the compressor section 21 may be drivingly connected and rotatable with one or more turbines of the turbine section 31 by way of the one or more shafts 35.

The propeller assembly 14 generally includes a fan rotor 16. The fan rotor 16 includes a plurality of fan or propeller blades 42 that are coupled to and extend outwardly from the fan rotor 16 in the radial direction R. In the embodiment shown in FIG. 7, the fan rotor 16 may extend in the axial direction A toward the forward end 99 from the housing 45. The propeller assembly 14 further includes the beta tube assembly 100 coupled within the housing 45 defining a gearbox therewithin and extended toward the second end 98 and coupled to the generator or engine core 20.

In one embodiment, the housing 45 may include an epicyclical gear train 50 including a star gear 52 and a plurality of planet gears 54. The plurality of planet gears 54 may each be fixed such that each planet gear 54 rotates on a fixed axis relative to the star gear 52. An annular gear 56 surrounds the plurality of planet gears 54 and rotates and transfers power and torque from the star gear 52 through the plurality of planet gears 54. In the embodiments shown herein, the annular gear 56 may be coupled to or otherwise integral with the fan rotor 16. In various embodiments, the housing 45 may further include additional planet gears disposed radially between the plurality of planet gears 54 and the star gear 52, or between the plurality of planet gears 54 and the annular gear 56.

Referring back to FIGS. 1-7, the beta tube assembly 100 is connected to the generator or engine core 20 to transmit torque and power through the star gear 52 to the housing 45 to the fan rotor 16. The fan rotor 16 may be connected to the surrounding annular gear 56 or the planet gears 54 to receive torque from the star gear 52 and transfer torque to drive the fan or propeller assembly 14. As power and torque are transmitted from the engine core 20, the housing 45 provides power and torque at an output speed to the fan rotor 16 more suitably adjusted for the fan or propeller assembly 14. For example, the housing 45 may reduce fan rotor 16 speed relative to the engine core 20 by a factor of two or more.

During operation of the turbine 10, as shown and described in regard to FIGS. 1-7 collectively, a volume of air as indicated schematically by arrows 90 enters the turbine 10. As the air 90 passes across the propeller blades 42, a portion of the air as indicated schematically by arrows 91 is directed or routed outside of the engine core 20 to provide propulsion. Additionally, another portion of air as indicated schematically by arrows 92 is directed or routed through an associated inlet 80 into the compressor section 21. The air 92 is progressively compressed as it flows through the compressor section 21, such as through the LPC 22 and the HPC 24, toward the combustion section 26.

The now compressed air as indicated schematically by arrows 93 flows into the combustion section 26 where a fuel is introduced, mixed with at least a portion of the compressed air 93, and ignited to form combustion gases 94. The combustion gases 94 flow into the turbine section 31, causing rotary members of the turbine section 31 to rotate and support operation of respectively coupled rotary members in the compressor section 21 and/or fan or propeller assembly 14. For example, the HPC 24 and the HPT 28 may be coupled and rotatable to drive the turbine 10 and generate combustion gases 94 at the combustion section 26 to drive the LPT 30. The LPT 30 may be connected to the LPC 22.

The housing 45 defining a gearbox reduces the rotational speed from the generator or engine core 20 (e.g. the compressor section 21 or the turbine section 31) and provides a desired amount of torque and rotational speed to the fan or propeller assembly 14.

Figure 8:
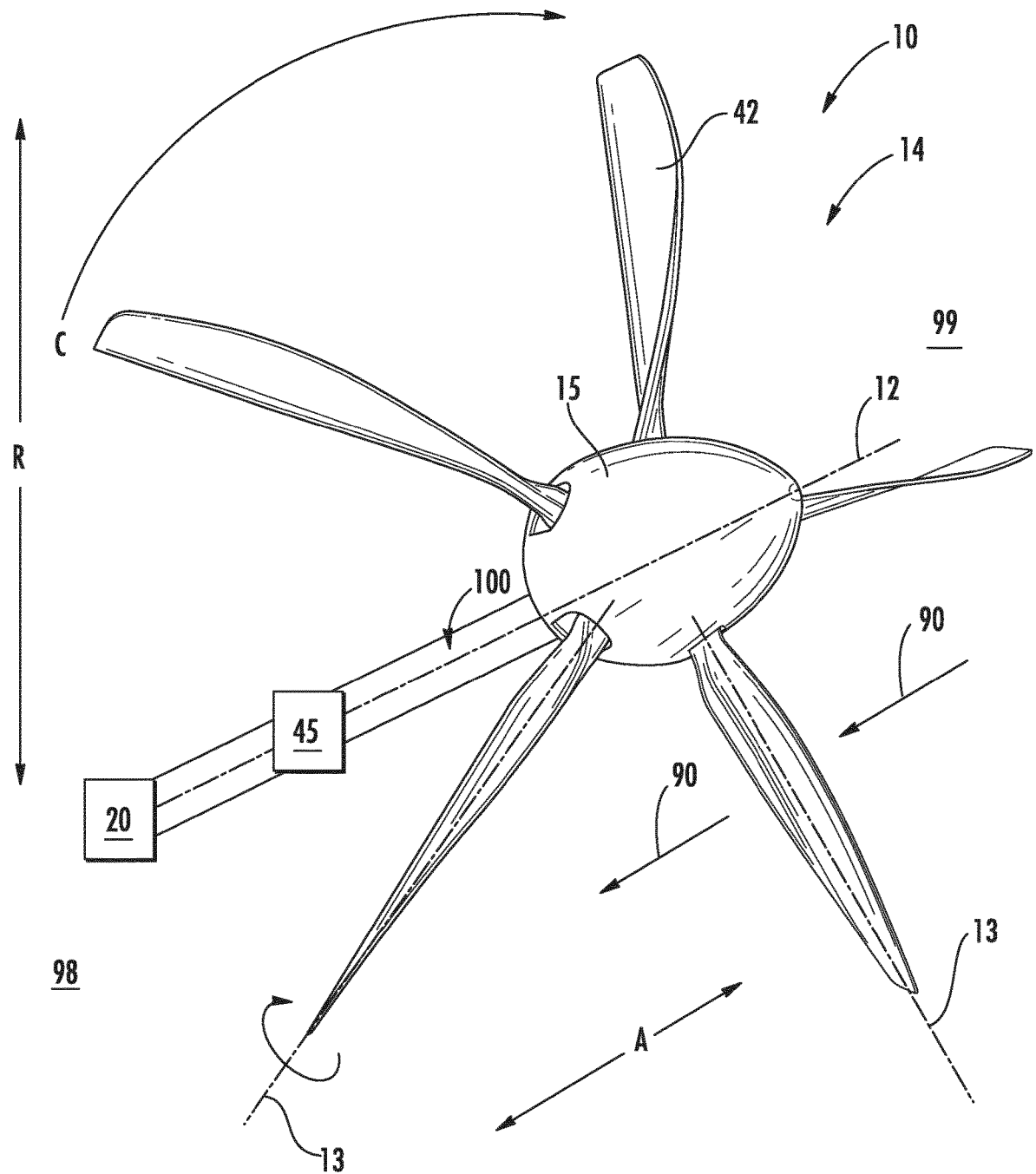
FIG. 8 is a perspective view of another exemplary embodiment of a turbine including an aspect of the present disclosure.

Referring now to FIG. 8, an exemplary embodiment of the turbine 10 is generally provided in which the turbine 10 defines a power generating turbine, such as a wind turbine. The turbine 10 is coupled to the housing 45 and the generator or engine core 20. In various embodiments, the housing 45 defines a gearbox therewithin to increase a rotational speed from the plurality of blades 42 of the propeller assembly 14 to the generator or engine core 20. In one embodiment, the generator or engine core 20 defines a power generation unit connected to a power grid. The fluid, such as air, depicted schematically by arrows 90, causes rotation of the plurality of blades 42 about the axial centerline 12. The rotation of the plurality of blades 42 is further proportionally increased by the housing 45 defining a gearbox therewithin. The housing 45 is rotatably coupled to the generator or engine core 20 to produce and deliver power, such as electricity. As conditions of the air 90 change, such as wind speed, turbulence, shear, temperature, pressure, etc., the plurality of blades 42 may change or adjust pitch about the pitch axis 13 to alter or regulate an amount of power or energy being generated and delivered to the housing 45 and the generator or engine core 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A turbine engine defining an axial direction, a radial direction, a circumferential direction, a first end and a second end opposite of the first end along the axial direction, the turbine engine comprising:
   a propeller assembly proximate to the first end comprising a plurality of blades arranged in the circumferential direction disposed around an axial centerline, and a feathering mechanism including a hollow piston rod, wherein the hollow piston rod defines one or more piston rod fastening locations proximate to the first end, wherein the feathering mechanism rotates the plurality of blades about a pitch axis extended in the radial direction from the axial centerline;
   a housing proximate to the second end disposed in adjacent arrangement with the propeller assembly in the axial direction, wherein the axial centerline is defined through the propeller assembly and the housing;
   a beta tube assembly extended through the hollow piston rod and at least partially through the housing in coaxial alignment with the axial centerline, wherein the beta tube assembly defines an at least partially hollow walled pipe extended along the axial direction, and wherein the beta tube assembly defines a plurality of grooves extended along the axial direction proximate to the housing, wherein a first groove extends at least partially in the circumferential direction and along the axial direction to at least partially define a helix corresponding to a rotatable range of the plurality of blades about the pitch axis, and wherein a second groove extends in the axial direction; and
   a plug lock, wherein the plug lock at least partially defines a diameter corresponding to an inner diameter of the hollow piston rod, and wherein the plug lock at least partially defines a key extended in the axial direction corresponding to an elongated slot of the beta tube assembly.

2. The turbine engine of claim 1, wherein the beta tube assembly defines at the first end the elongated slot extended along the axial direction, wherein the beta tube assembly further defines an opening in the elongated slot toward the first end of the beta tube assembly.

3. The turbine engine of claim 2, wherein the piston rod defines one or more piston rod fastening locations proximate to the first end.

4. The turbine engine of claim 3, wherein the one or more piston rod fastening locations are defined along the circumferential direction to correspond to a circumferential position of the plurality of blades.

5. The turbine engine of claim 1, wherein the plug lock further defines one or more plug lock fastening locations.

6. The turbine engine of claim 5, wherein the one or more plug lock fastening locations corresponds to the one or more piston rod fastening locations.

7. The turbine engine of claim 5, wherein the plug lock fastening location and the piston rod fastening location correlate the first groove to an angle of the plurality of blades along the pitch axis.

8. The turbine engine of claim 1, wherein the housing further comprises:
   a sensor extended through the housing at least partially in the radial direction, wherein the sensor defines a sensing element proximate to the plurality of grooves of the beta tube assembly.

9. The turbine engine of claim 8, wherein the sensor defines a capacitive, magnetic, or inductive proximity sensor.

10. The turbine engine of claim 1, wherein the piston rod defines an internally threaded portion, and wherein the beta tube assembly defines an externally threaded portion corresponding to the internally threaded portion of the piston rod.

11. The turbine engine of claim 1, wherein the beta tube assembly defines one or more internal walls, and wherein the one or more internal walls defines a hydraulic fluid transfer cavity.

12. The turbine engine of claim 11, wherein the beta tube assembly further defines a plurality of hydraulic fluid transfer orifices.

13. A method of determining angular position about a pitch axis of propeller blades in a feathering propeller assembly and a rate of change thereof, the method comprising:
   positioning a first groove on a beta tube assembly corresponding to an angular position of the propeller blades about a pitch axis of the feathering propeller assembly;
   setting an angular position of the beta tube assembly to correspond to the angular position of the propeller blades, wherein setting an angular position of the beta tube assembly comprises:
   defining a fastening location of a piston rod relative to the beta tube assembly, wherein the fastening location corresponds to the angular position of the propeller blades; and defining, with a plug lock, one or more plug lock fastening locations to correspond to the one or more piston rod fastening locations;
positioning a second groove on the beta tube assembly corresponding to a reference angle;
rotating the beta tube assembly about an axial centerline;
positioning a proximity sensor relative to the first groove and the second groove such that the proximity sensor captures a signal from the first groove and the second groove when in rotation; and
determining the angular position of the propeller blades.

14. The method of claim 13, wherein the signal is a time between the each of the first groove and the second groove reaching radial proximity to the proximity sensor as the beta tube rotates about the axial centerline.

15. The method of claim 13, wherein determining the angular position of the propeller blades further comprises corresponding the signal from the first groove relative to the signal from the second groove to the angular position of the propeller blades about the pitch axis.

16. The method of claim 13, wherein the first groove defines an at least partially helical groove on the beta tube assembly along an axial direction.

17. The method of claim 13, the method further comprising:
translating the beta tube assembly along the axial direction such that a circumferential distance between the first groove and the second groove changes along the axial direction.

18. The method of claim 13, the method further comprising:
joining the plug lock to the piston rod; and
inserting the plug lock through the piston rod and into the elongated slot.

19. The method of claim 13, the method further comprising:
securing, with the plug lock, a radial orientation of the beta tube assembly relative to the piston rod; and
securing, with the plug lock, a radial orientation of the beta tube assembly to correspond to a pitch angle of the plurality of blades.

20. The method of claim 13, the method further comprising:
clocking, with the plug lock, the piston rod while the plurality of blades define a feathered position; and
clocking, with the plug lock, the beta tube assembly while the plurality of blades define a feathered position.

* * * * *